United States Patent Office 3,574,850
Patented Apr. 13, 1971

3,574,850
MEDICAMENT HAVING PARTICULARLY AN ANTIFUNGAL BACTERICIDAL AND BACTERIOSTATIC ACTIVITY
Claude R. Guillon, Paris, France, assignor to Expanscience, Courbevoie, Hauts-de-Seine, France
No Drawing. Continuation of application Ser. No. 704,946, Feb. 12, 1968. This application Oct. 7, 1969, Ser. No. 871,753
Claims priority, application France, Oct. 6, 1964, 990,499
Int. Cl. A61k 27/00
U.S. Cl. 424—319
1 Claim

ABSTRACT OF THE DISCLOSURE

An antiseptic composition comprising an aqueous solution of dodecyloxypropylamine-β-butyric acid, dodecylaminopropylamino-β-butyric acid and an alkyl dimethyl benzyl ammonium chloride, said alkyl having from 8 to 18 carbon atoms, in a weight ratio of 1 to 1 to 0.5, in a pharmacological solvent medium. The antiseptic composition of the invention has an antifungicidal, bactericidal and bacteriostatic activity.

PRIOR APPLICATIONS

This application is a streamlined continuation of application Ser. No. 704,946, filed Feb. 12, 1968, now abandoned, which in turn is a streamlined continuation of application Ser. No. 492,839, filed Oct. 4, 1965, now abandoned.

Dodecyloxypropylamino-β-butyric acid is the compound of the formula:

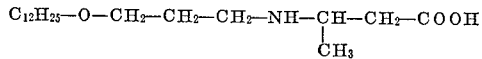

and its molecular weight is 329. It exists in the form of white flakes, which are greasy to the touch and are of bitter taste. It is readily soluble in alcohol, more difficultly soluble in water and practically insoluble in acetone. Its melting point is 121 to 123° C. It is an amphoteric substance and the pH value of a 2% aqueous solution thereof is approximately 5.15. It can be identified by reaction with pyrocatechol and silver oxide, when it gives a violet-tinted pink colouring, and by reaction with ninhydrin, when it causes a violet colouring to develop.

This acid can be prepared by condensing lauryl alcohol with acrylonitrile, reducing the condensation product to the amine and adding crotonic acid to the primary amino group.

In order to purify the product, it is heated in water to 70 to 80° C. and, on cooling, the acid of low solubility in water crystallises out (melting point: 122±1° C.); it is washed, centrifuged and dried.

The other essential active ingredient, dodecylaminopropylamino-β-butyric acid, is the compound of the formula:

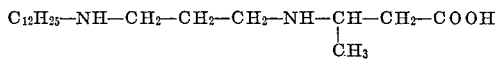

and its molecular weight is 328.

In order to prepare this compound, 1 mol. of dodecylamine can be heated to 60 to 70° C., with 1 mol. of acrylonitrile while stirring constantly for 20 minutes. The mixture is kept for 6 hours at 100° C., then the product is subjected to a hydrogenation in the presence of Raney nickel and ammonia at 130 to 140° C. and under a hydrogen pressure of 150 atm., for 2 hours at the start of the operation in order to obtain monododecyl-1,3-aminopropylamine. After elimination of the catalyst by filtration, the crude product is subjected to fractionated distillation. The desired product is mixed, in equi-molecular proportions, with crotonic acid, with constant stirring at 100° C. in order to obtain the required amino acid. To purify the acid, the product is dissolved in methyl ethyl ketone on a boiling water bath. The dodecylaminopropylamino-β-butyric acid crystallises on cooling. This is centrifuged and evaporated.

As disclosed above, the composition can optionally contain, as a third principle, an alkyl dimethyl benzyl ammonium chloride. These compounds are disclosed in the United States Pharmacopeia (USP XVI) under the name of benzalkonium chloride. They are quaternary ammonium salts containing a benzyl radical, two methyl radicals and a $C_8H_{17}$ to $C_{18}H_{37}$ alkyl radical. They exist in the form of amorphous white powders or yellowish gelatinous masses. They have in aromatic odour and a very bitter taste, and are very soluble in water, alcohol, acetone, practically insoluble in ether and slightly soluble in benzene.

The composition provided by the invention may be in the form of an aqueous solution but, in this case, having regard to the low solubility of same of the constituents (and particularly of dodecyloxypropylamino-β-butyric acid) in water, the solubilisation is improved by including a physiologically acceptable acid, for example, tartaric acid. The composition may alternatively be in the form of an alcoholic tincture, ointment, gel, milk, liquid, soap, ovule, collutory, nasal, drop or collyrea, etc.

The proportions of the various constituents occurring in the composition can be varied up to the limits imposed by the solubility, but generally preference is given to proportions in the region of 1% of each of the acids and about 0.5% for the benzalkonium chloride.

Using a solution comprising 1% of dodecyloxypropylamino-β-butyric acid (designated hereinafter by A), 1% of dodecylaminopropylamino-β-butyric acid (designated hereinafter by B), and 0.5% of benzalkonium chloride (designated hereinafter by C), and having a pH value equal to 3.9, the following investigations were carried out.

Bacteriostatic power by diffusion in agar

Filter paper discs were impregnated by 0.02 cc. of the solution. The inhibition of the discs, measured as the diameter of inhibition in millimetres for various microorganisms which were used as set out in the following table.

Microorganisms used:       A 1%+B 1%+C 0.5%

| Microorganism | Value |
|---|---|
| Staphylococcus aureus No. 101 IPL (1/30,000) | 19 |
| Staphylococcus aureus No. 1060 IPL resistant to antibiotics (1/30,000) | 18 |
| Hemolytic streptococcus Grp. No. 6 IPL (1/100) | 14 |
| Hemolytic streptococcus Gr. A No. 435 IPL (1/100) | 17 |
| Streptococcus faecalis (Enteroccus) No. P IPL (1/300) | 21 |
| Corynebacterium xerose No. 12 IPL (1/100) | 25 |
| Spores of Bacillus subtilis No. 3096 (1/30,000) | 22 |
| Klebsiella No. 21 IPL (1/30,000) | 11 |
| Escherichia coli No. 24 IPL (1/30,000) | 15 |
| Pathogenic Escherichia coli No. 111 B4 No. 415 IPL (1/30,000) | 15 |
| Salmonella typhi No. 489 IPL (1/30,000) | 19 |
| Proteus No. 411 IPL (1/30,000) | 0 |
| Pseudomonas aeruginosa (Pyocyanic) No. 725 IPL (1/30,000) | 0 |

Bactericidal power by notation of the surviving elements

To study the bactericidal power of a composition according to the invention samples of it were brought into contact in a microbial suspension for times of 1, 5, 10, 30, 60 minutes, 18 hours. After this contact, the microorganisms of the suspension were transplanted onto a solid medium and the percentage of the survivors was evaluated. Using the same solution, which, in the liquid medium, was diluted to a tenth, and the same types of microorganisms as those which served for the study of the bacteriostatic power, it was found that the percentage of surviving elements was zero for the first eleven types of microoranisms after 1 minute. For Proteus No. 411 IPL, it was found that there were 0.1% of surviving elements for a period of contact of 1 minute and no surviving element for longer periods of contact. For *Pseudomonas aeruginosea* No. 725 IPL, the percentage of surviving elements was equal to 0.01 for a contact time of 1 minute and no surviving element was observed for longer contact times.

Bacteriostatic and bactericidal power by dilution in liquid medium

In order to evaluate the bacteriostatic and bactericidal power, a method of dilution in culture broth was used, the solution being distributed in tubes. The first dilution was a 25% dilution and the inhibition after 24 hours in the oven is evaluated.

A sample from each of the tubes which had not grown was transplanted on a new tube of fresh medium (ordinary agar) in order to check the bactericidal activity. The figures expressing the inhibiting dilution for various microorganisms being used are given in the following table.

| Microorganisms | A 1% plus B 1% plus C 0.5% | |
|---|---|---|
| | b | B |
| *Staphylococcus aureus* No. 101 IPL | 1/6,144 | 1/3,072 |
| *Staphylococcus aureus* No. 1060 resistant to antibiotics | 1/6,144 | 1/768 |
| *Hemolytic streptococcus* Gr. B. No. 6 IPL | 1/6,144 | 0 |
| *Hemolytic streptococcus* Gr. A. No. 435 IPL | 1/3,072 | 0 |
| *Streptococcus faecalis* (Enteroccos No. 9 ILP) | 1/6,144 | 0 |
| *Corynebacterium xerose* No. 12 IPL | 1/24 | 0 |
| Spores of *Bacillus subtilis* No. 3906 IPL | 1/6,144 | 0 |
| *Klebsiella* No. 21 IPL | 1/384 | 1/96 |
| Pathogenic *Escherichia coli* No. 415 IPL (III B4) | 1/192 | 0 |
| *Salmonella typhi* No. 489 IPL | 1/768 | 0 |
| *Proteus* No. 411 IPL | 1/96 | 1/6 |
| *Pseudemonas aeruginosa* (Pyocyanic) No. 725 IPL | 1/96 | 1/24 |
| *Escherichia coli* No. 24 IPL | 1/1,536 | 1/384 | b = bacteriostatic power.
B = bactericidal power.

Antifungicidal action

For this investigation, liquid Sabouraud medium was used as culture medium, and also a method of dilution in liquid medium. Cultivation took place for eight days at 24° C.

The figures expressing the inhibiting dilution with different types of fungi are given in the following table:

| Microorganism | b | B |
|---|---|---|
| *Candida albicans* | 1/1,096 | 0 |
| *Aspergillus niger* | 1/2,048 | 0 |
| *Rhizopus nigricans* | 1/1,024 | 0 |
| *Mucor mucedo* | 0 | 0 |
| *Tricophyton gypseum* | 1/4,096 | 0 |
| *Tricophyton mentagrophytes* | 1/2,048 | 0 |

The various results set out above show that the composition according to the invention is endowed with a very strong antifungicidal activity and a very strong bactericidal and bacteriostatic activity.

In order to illustrate the invention, examples of a medicinal composition according to the invention and capable of being used as antiseptic are given below. Nethertheless, it is to be understood that these are two preferred of many pharmaceutical forms. Similarly, the composition may possibly comprise other antiseptics, for example mercury salts, chlorinated compounds, substituted phenols, and/or anti-inflammatory agents, particularly of the corticoid type, or ε-aminocaproic acid.

EXAMPLE 1

An antiseptic was prepared in the form of an aqueous solution, having the following composition:

Dodecyloxypropylamino-β-butyric acid: 1 g.
Dodecylaminopropylamino-β-butyric acid: 1 g.
Benzalkonium chloride: 0.50 g.
Tartaric acid, q.s. for pH 4.20.
Water q.s. for 100 g.

EXAMPLE 2

In similar manner, an alcoholic tincture which can be used as antiseptic had the following composition:

Dodecyloxypropylamino-β-butyric acid: 1 g.
Dodecylaminopropylamino-β-butyric acid: 1 g.
Benzalkonium chloride: 0.50 g.
Erythrosine J (tetraiodofluorescein): 0.05 g.
Tartaric acid q.s. for pH 4.20
Alcohol 70° q.s. for 100 g.

For comparing the synergistic properties of the composition according to the invention with the properties of its constituents or partial combinations of its constituents, two series of investigations were carried out with the aid of the following four solutions:

Solution B, which is a 1% solution of dodecylaminopropylamino-β-butyric acid;
Solution ABC, corresponding to the solution of Example 1;
Solution BC, comprising 1% of dodecylaminopropylamino-β-butyric acid and 0.50% of benzalkonium chloride, this solution being at pH 4.20;
Solution C, formed by a 0.50% benzalkonium chloride solution.

Comparison of the bacteriostatic activity of the four solutions.

The product to be studied was diluted before-hand in sterile distilled water and the solution obtained was included in a slightly buffered glucose-agar medium at pH 7 and poured into Petri dishes.

The microorganism in its turn was cultivated before-hand for 10 to 12 hours in a saline peptone broth. The culture thus obtained was diluted to 1/200 before being distributed in streaks on the agar containing the product to be studied.

The reading of the results was made fifteen hours after having been in the oven at 37° C. The microorganisms studied were the following:

(1) *Staphylococcus pyogenes* var. *aureus* ATCC 6538 P;
(2) *Escherichia coli* 111 B4 52169, Institut Pasteur, Paris (pathogenic);
(3) *Escherichia coli*, strain of Faculte de Pharmacie de Paris;
(4) *Streptococcus agalactia*, group B 55118, Institut Pasteur, Paris (hemolytic);
(5) *Streptococcus faecalis* GB 5434, Institut Pasteur, Paris;
(6) *Proteus vulgaris*, strain of Faculte de Pharmacie.

The results set out in the following table are expressed in cc. of initial solution contained in 1 cc. or agar medium. For example, taking into account successive dilutions, there is observed a bacteriostatic activity with 0.001 cc. of solution per cc. of agar, that is to say, a ratio of 1:1000.

| Microorganisms | 1 | 2 | 3 | 4 | 5 | 6 |
|---|---|---|---|---|---|---|
| Solution ABC | 1/800 | 1/50 | 1/10 | 1/500 | 1/250–1/500 | 1/100 |
| Solution B | 1/200 | 1/50 | 1/10 | 1/250 | 1/100 | 1/50 |
| Solution BC | 1/800 | 1/50 | 1/20 | 1/500 | 1/100 | 1/50 |
| Solution C | 1/1,000 | 1/20 | 1/10 | 1/500 | 1/500 | 1/10 |

Comparison of the bactericidal activity of the four solutions.

The product to be studied was diluted beforehand in sterile distilled water and the solution obtained was added to a saline peptone broth slightly buffered to pH 7, the broth having been seeded beforehand with a culture of 15/16 hours at 37° C. of the microorganism, diluted to 1/10,000.

Generally speaking, the contact between the solution and the microorganism was one hour at ambient temperature. At the end of this period, the number of surviving microorganisms were counted, the counting being effected by placing on agar and reading the colonies which have appeared 15/28 hours after being in the oven at 37° C. The microorganisms investigated were of the same type as those which were used in the comparative study of the bacteriostatic activity The concentration for which it was shown that only 1% of the microorganisms survived was considered as appreciable activity. The concentrations given in the following table are expressed in cc. of initial solution in 1 cc. of medium; for example, if a solution with a dilution of 1/100 is still active, the notation is 0.001/cc. that is to say, a ratio of 1:1000.

| Microorganisms | 1 | 2 | 3 | 4 | 5 | 6 |
|---|---|---|---|---|---|---|
| Solution ABC | *1/200 | 1/100 | 1/20 | *1/200 | *1/200 | *1/200 |
| Solution B | *1/200 | 1/10-1/20 | 1/50-1/100 | *1/200 | 1/100 | 1/100 |
| Solution BC | *1/200 | 1/100 | 1/20 | *1/200 | *1/200 | 1/200 |
| Solution C | *1/200 | 1/100 | 1/50-1/100 | 1/100 | *1/200 | 1/50 |

*The products were not tested at higher dilutions.

These comparative studies show the superiority of the solution ABC according to the invention by comparison with the other solutions. Thus, as regards the bacteriostatic activity:

(a) It is solution B which is least active against *Staphylococcus pyogenes*, (b) It is solution C which is least active against *Escherichia coli*, (c) The activity of all the solutions is fairly weak against *Escherichia coli* (Fac. Pharm. Paris), (d) All these solutions are clearly active against *Streptococcus agalactiae*, (e) The solutions ABC and C are those which are the most active against *Streptococcus faecalis*, (f) The solution C has an activity much less than that of the three other solutions against *Proteus vulgaris*.

As regards the bactericidal activity:

(a) All the solutions are very active against *Staphylococcus pyogenes*, (b) The solution B is of a very low activity against respect to the other three against *Escherichia coli*, (c) The solutions BC and ABC are the least active against *Escherichia coli* (Fac. Pharm. Paris), (d) The solution C is clearly less active than the other three against *Streptococcus agalactiae*, (e) The solution B is clearly less active than the other three against *Streptococcus faecalis*, (f) The solution C is less active than the other three against *Proteus vulgaris*, the difference being very marked with respect to the solution ABC.

I claim:

1. An antiseptic composition comprising an aqueous solution of dodecyloxypropylamino-$\beta$-butyric acid, dodecylaminopropylamino-$\beta$-butyric acid and alkyl dimethyl benzyl ammonium chloride, said alkyl having from 8 to 18 carbon atoms, in a weight ratio of about 1 to 1 to 0.5 and tartaric acid sufficient to give a pH in said solution of about 4.2, in a pharmacological solvent media.

References Cited

UNITED STATES PATENTS

| 2,108,765 | 2/1938 | Domagk | 424—329 |
| 2,113,606 | 4/1938 | Taub | 424—329 |
| 3,039,917 | 6/1962 | Schmitz | 424—319 |

FOREIGN PATENTS

| 1,045,601 | 12/1958 | Germany | 424—319 |

JEROME D. GOLDBERG, Primary Examiner

U.S. Cl. X.R.

424—329